(12) United States Patent
Krzesicki et al.

(10) Patent No.: US 6,702,707 B2
(45) Date of Patent: Mar. 9, 2004

(54) DIFFERENTIAL ASSEMBLY

(75) Inventors: Richard Michael Krzesicki, Ann Arbor, MI (US); Gregory James Stout, Ann Arbor, MI (US); Brian Christian Orr, Macomb, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/185,856

(22) Filed: Jun. 27, 2002

(65) Prior Publication Data

US 2003/0144108 A1 Jul. 31, 2003

Related U.S. Application Data

(63) Continuation-in-part of application No. 10/062,004, filed on Jan. 31, 2002.

(51) Int. Cl.[7] .......................... F16H 48/00; F16H 48/08; F16D 1/033; F16D 1/076
(52) U.S. Cl. ........................................ 475/230; 403/338
(58) Field of Search .......................... 475/230; 29/893, 29/893.1, 893.2; 74/424; 403/338, 337, 290, 289

(56) References Cited

U.S. PATENT DOCUMENTS

| 2,061,009 | A | * | 11/1936 | Rothrock | 475/246 |
| 3,524,665 | A | * | 8/1970 | Hohn et al. | 403/273 |
| 4,125,026 | A | * | 11/1978 | Torii et al. | 475/230 |
| 4,543,011 | A | * | 9/1985 | Lindenthal | 403/338 |
| 4,628,753 | A | * | 12/1986 | Heine et al. | 74/447 |
| 5,193,432 | A | * | 3/1993 | Smith | 92/63 |

FOREIGN PATENT DOCUMENTS

EP 647789 A1 * 4/1995

* cited by examiner

*Primary Examiner*—Ankur Parekh
(74) *Attorney, Agent, or Firm*—Brinks Hofer Gilson & Lione

(57) ABSTRACT

A differential gear assembly including a differential housing and a ring gear mounted externally to the differential housing by a clamp. The differential housing and the ring gear each include an annular flange extending therefrom and the clamp includes a pocket which is adapted to receive the annular flanges therein. In another aspect, the flanges include opposing angled surfaces and the pocket includes opposing angled sides, whereby when the clamp is placed to the flanges, the angled surfaces of the flanges engage the angled sides of the clamp such that the clamp provides an axial clamping force to the flanges.

20 Claims, 4 Drawing Sheets

DIFFERENTIAL ASSEMBLY

CROSS-REFERENCE TO RELATED APPLICATIONS

The present invention is a continuation-in-part application corresponding to U.S. patent application Ser. No. 10/062,004 filed on Jan. 31, 2002, entitled "Differential Assembly".

BACKGROUND OF INVENTION

1. Technical Field of the Invention

The present invention generally relates to a differential assembly. More specifically, the present invention relates to the novel manner in which the ring gear is attached to the differential housing.

2. Description of the Prior Art

In an automotive vehicle, a differential gear assembly is used to transfer power from a rotating driveshaft to the axles and wheels of the vehicle. The rotating driveshaft of the vehicle engages a ring gear which is mounted onto a differential housing. The end of the driveshaft and the ring gear are adapted to transfer rotation from the drive shaft to the differential housing such that the differential housing rotates transverse to the driveshaft. Within the differential housing, the ends of the axles of the automobile are supported and connected to the differential housing through a differential gear set, such as a bevel differential gear set. Thus, the ring gear of the differential housing allows the driveshaft to rotate the differential housing in a direction transverse to the driveshaft, whereby the differential gear set rotates the axles of the vehicle to drive the wheels of the vehicle.

Typically the differential housing includes a flange extending around an outer diameter of the differential housing. Currently, the most common method of attaching the ring gear to the differential housing is by drilling and tapping a plurality of holes within the flange and bolting the ring gear to the flange. The differential housing and the ring gear must be structurally sound enough to withstand the localized stresses at the tapped holes and to maintain their overall strength. To accomplish this, the ring gear and the differential housing must be thick and large. This adds size and weight to the differential gear assembly.

As seen from the above, there is a need to improve the structural integrity of a differential gear assembly while also decreasing weight.

It is therefore an object of this invention to provide a differential gear assembly with a differential housing and a ring gear having features which allow the ring gear to be attached to the differential housing without compromising the structural integrity of the differential housing or the ring gear while also reducing the weight of the assembly.

SUMMARY OF THE INVENTION

The disadvantages of the prior art are overcome by providing a differential gear assembly, in accordance with the present invention, in which the ring gear is attached to the differential housing in a manner that does not compromise the structural integrity of the differential housing or the ring gear.

In a first aspect of the present invention, the differential gear assembly includes a differential housing, a gear set mounted therein (which is typical of such differential gear assemblies) and a ring gear mounted externally to the differential housing and held thereto by a clamp. One advantage of the present invention is that the ring gear is not secured to the differential housing by bolts. Therefore, no drilled or tapped holes are formed within the ring gear or the differential housing. The ring gear and the differential housing can be designed without compensating for weaknesses in the structure due to the drilled and tapped holes, which are typical in prior art differential gear assemblies.

In another aspect of the present invention, the differential housing and the ring gear each include an annular flange and the clamp includes a pocket which is adapted to receive the annular flanges to secure the ring gear onto the differential housing.

In still another aspect of the present invention, the differential housing includes a pinion pin secured to and extending diametrically across the ring gear. The ring gear includes features that receive the ends of the pinion pin whereby load is transferred from the ring gear directly to the pinion pin.

In yet another aspect of the present invention, the flanges of the differential housing and the ring gear are formed with opposing angled surfaces and the pocket within the clamp includes a bottom and opposing angled sides. When the clamp is placed to the flanges, the angled surfaces of the flanges engage the angled sides of the clamp such that the clamp provides an axial clamping force to the flanges.

DETAILED DESCRIPTION OF THE PREFERRED EMBODIMENTS

Figure 1:
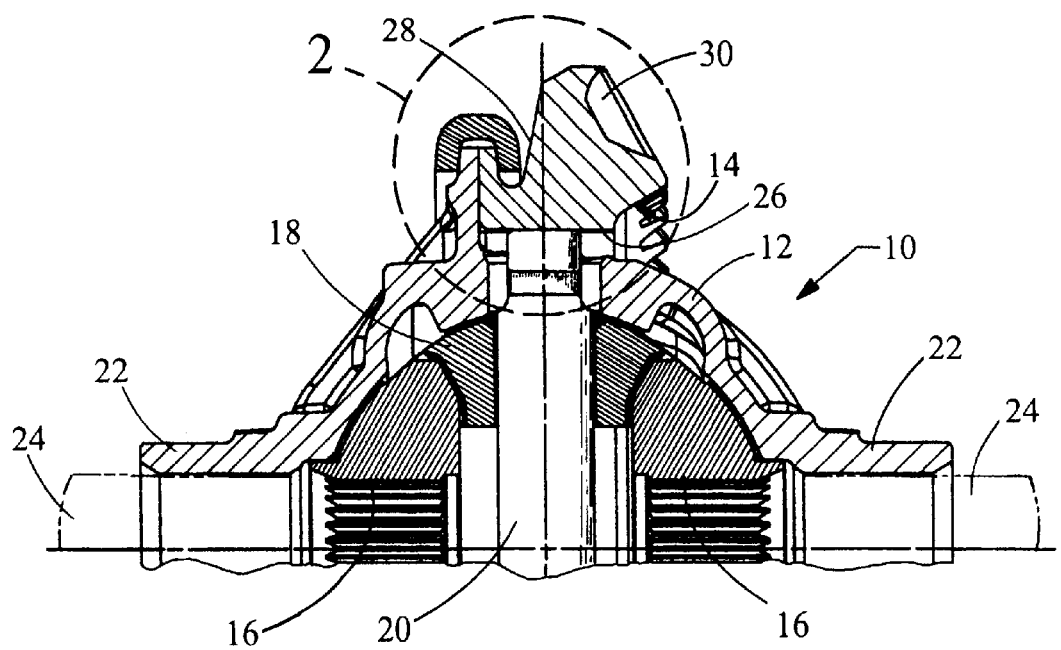
FIG. 1 is a partial sectional view of a differential gear assembly of the present invention.
Figure 2:
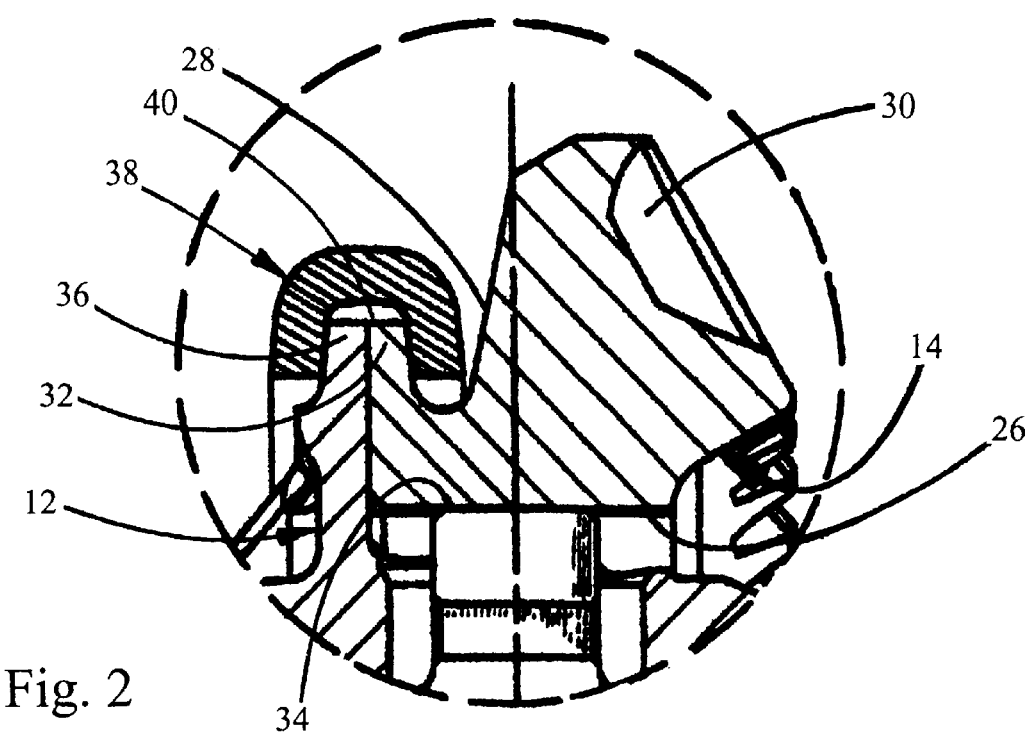
FIG. 2 is an enlarged view of the differential gear assembly encircled by line 2 in FIG. 1.

Referring to FIGS. 1 and 2, a partial sectional view of a differential gear assembly is shown at 10. The differential gear assembly 10 generally includes a differential housing 12 with a ring gear 14 mounted externally and a gear set 15 mounted therein. It is noted that, as seen in FIG. 1, only one half of the assembly 10 is illustrated. The opposing half, however, is a mirror image of the illustrated half. A full view of the assembly 10 is therefore not believed necessary as one skilled in the field will readily appreciate the full construction and extent of the assembly 10.

The gear set 15 includes a pair of pinion gears 18 (one shown) and a pair of side gears 16. The pinion gears 18 are mounted onto a pinion pin 20 that is supported so as to rotate with the differential housing 12. Mounting of the pinion gears 18 onto the pinion pin 20 is such so as to allow rotational movement of the pinion gears 18.

The pinion pin 20 extends across the diameter of the differential housing 12. A portion of the pinion pin 20 extends beyond the differential housing 12 and partially across the ring gear 14. The ring gear 14 includes features which receive the ends of the pinion pin 20 to support and position the pinion pin 20 relative to the ring gear 14. In this manner, the pinion pin 20 is directly supported by the ring gear 14, and load is transferred directly from the ring gear 14 to the pinion pin 20. Preferably, the ring gear 14 and the pinion pin 20 are formed from hardened steel, however it is to be understood that other materials with similar hardness and strength properties could be used with substantially equal results. A more detailed discussion of how the pinion pin 20 is supported on the ring gear 14 is described in U.S. patent application Ser. No. 10/062,009, filed on Jan. 31, 2002 (attorney docket no. 10541-932/V201-0423) entitled "Differential Gear Assembly" which is assigned to the assignee of the present application and is hereby incorporated by reference into the present application.

The differential housing 12 includes a pair of extending neck portions 22, each of which are adapted to rotatably support a proximal end of an axle half-shaft 24. The distal ends of each of the axle half-shafts 24 are connected to a wheel of the vehicle. The proximal end of each of the axle half-shafts 24 are attached to one of the side gears 16 and the side gears 16 are engaged with the pinion gears 18. As such, rotation of the differential housing 12 is transferred through the pinion gears 18, to the side gears 16 and thereby to the axle half-shafts 24, all while allowing the axle half-shafts 24 to rotate relative to one another.

The ring gear 14 is generally annularly shaped having a substantially circular inner surface 26, a substantially circular outer surface 28 and a plurality of circumferentially spaced teeth 30 extending from a side face of the ring gear 14. The teeth 30 are adapted to provide smooth engagement with corresponding teeth of a bevel gear on the end of a drive shaft (not shown) of the vehicle. The ring gear 14 further includes an annular flange 32 extending from the outer surface 28, the purpose of which is more fully described below.

The differential housing 12 further includes an annular flange 36 extending therefrom. The annular flange 36 provides axial support for the ring gear 14 when the ring gear 14 is mounted onto the differential housing 12.

A clamp 38 secures the ring gear 14 to the differential housing 12. The clamp 38 extends annularly around the differential housing 12 and includes an annular channel formed within an inner surface of the clamp 38. The annular channel defines a pocket 40 that receives both the flanges 32, 36 of the differential housing 12 and the ring gear 14 therein. In the preferred embodiments of FIGS. 4 and 5, the clamp 38 comprises a pair of matched halves, a first half 42 and a second half 44. When the first and second halves 42, 44 are fastened to each other, the flanges 32, 36 are captively retained within the pocket 40.

The first and second halves 42, 44 can be made from sheet metal, wherein the sheet metal is formed into a channel to define the pocket 40. The first and second halves 42, 44 could also be made through a casting or powder metal process, wherein the two halves 42, 44 are made in a single die with a small amount of material connecting the two halves 42, 44. After removal from the die, the two halves 42, 44 are broken apart and the flash is removed. The advantage of this process would be minimized variability in the manufacturing process to insure that the two halves 42, 44 match properly.

Figure 4:
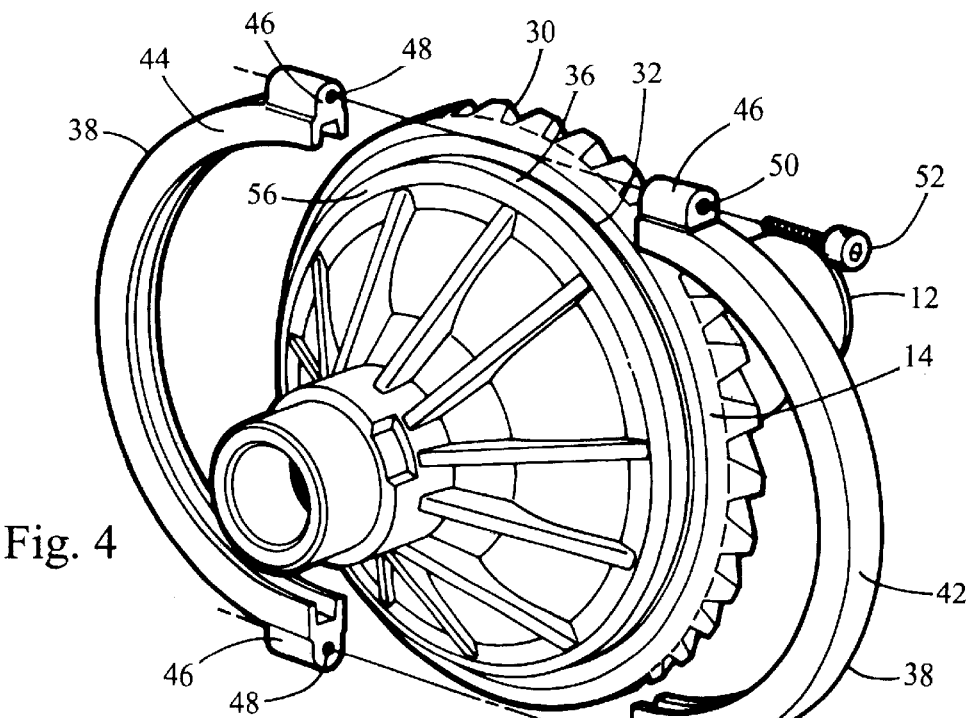
FIG. 4 is a partial exploded perspective view of a first preferred embodiment of the present invention.

In a first preferred embodiment, shown in FIG. 4, the first and second halves 42, 44 are seen as half circles, with each half circle including a pair of tabs 46 extending radially outward from the ends. The tabs 46 of the second half 44 include threaded holes 48 and the tabs 46 of the first half 42 include smooth holes 50. Bolts 52, extended through the smooth holes 50, thread into the threaded holes 48 to secure the first and second halves 42, 44 together.

The ring gear 14 is supported on the differential housing 12 by the flange 32. After the ring gear 14 is placed to the differential housing 12, the two halves 42, 44 of the clamp are placed such that the flanges 32, 36 are received within the pocket 40. The bolts 52 are then inserted through the smooth holes 50 and engaged with the threaded holes 48 to secure the first and second halves 42, 44 to one another. Alternatively, both holes 48 and 50 may be smooth with the threaded end of the bolt 52 extending beyond hole 48 and engaged by a nut. With the two halves 42, 44 of the clamp 38 secured to one another, the flanges 32, 36 are trapped within the pocket 40, thereby securing the ring gear 14 to the differential housing 12.

Figure 3:
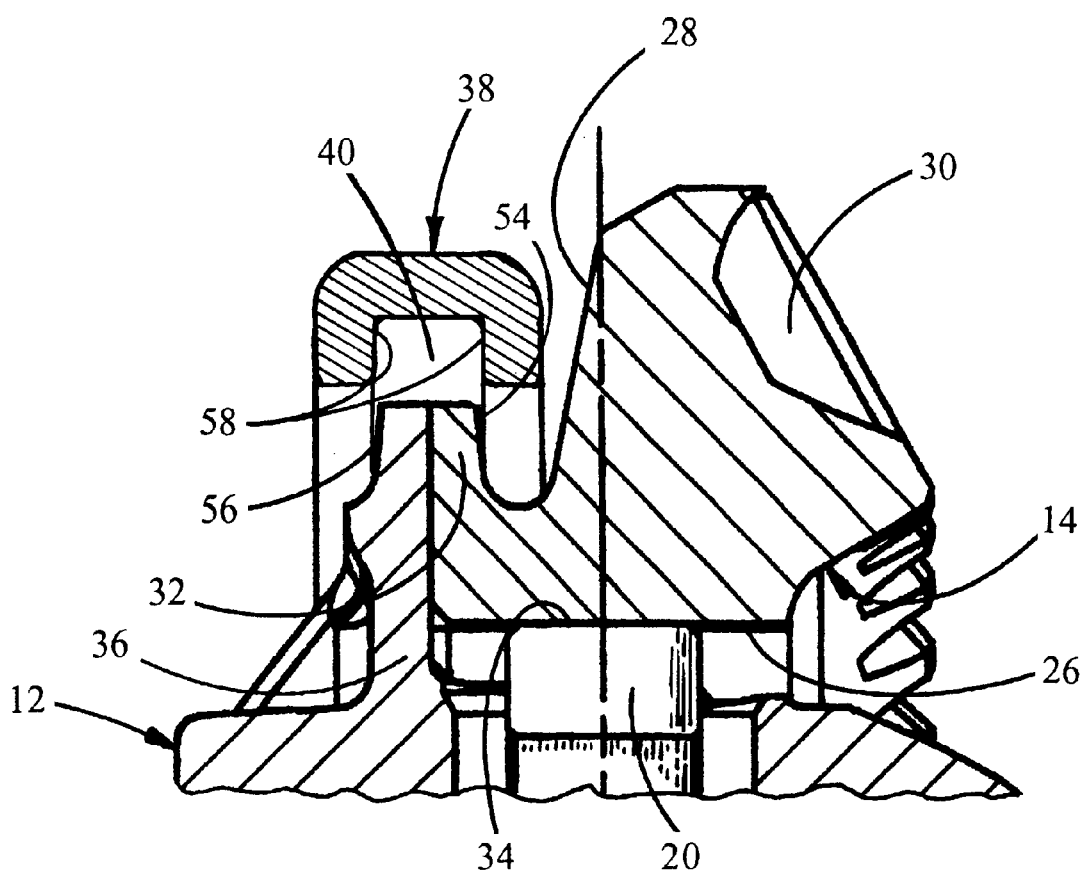
FIG. 3 is an enlarged view, similar to that shown in FIG. 2, showing the clamp spaced away from the flanges for clarity.

As readily seen in FIG. 3, the annular flange 32 of the ring gear 14 is provided with an angled surface 54 and the annular flange 36 of the differential housing 12 is provided with an angled surface 56. The angled surfaces 54, 56 face away from one another when the ring gear 14 is placed to the differential housing 12. Correspondingly, the pocket 40 of the clamp 38 includes opposing angled sides 58. When the clamp 38 engages the flanges 32, 36 the angled surfaces 54, 56 engage the angled sides 58 such that the clamp 38 provides an axial clamping force to the flanges 32, 36.

Figure 5:
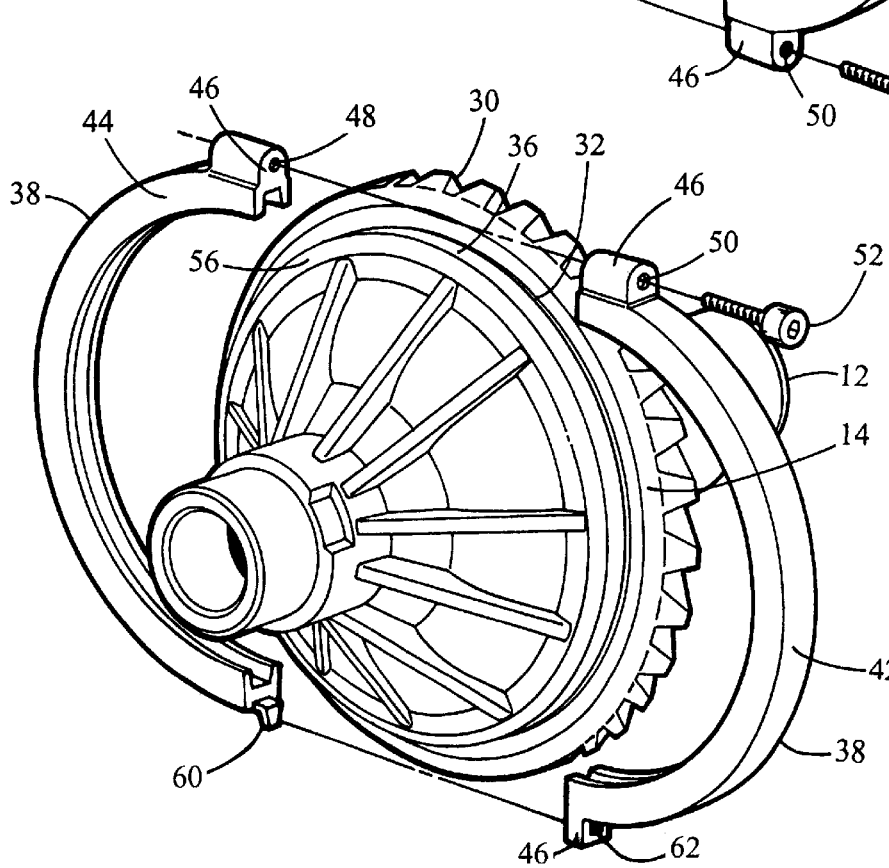
FIG. 5 is a partial exploded perspective view of a second preferred embodiment of the present invention.

In a second preferred embodiment, one of the tabs 46 of the second half 44 includes a threaded hole 48 and the other tab 46 of the second half 44 is formed as an appendage 60. On the first half 42, one of the tabs 46 includes a smooth hole 50 and the other tab 46 includes an aperture 62 adapted to engage the appendage 60, as shown in FIG. 5.

As the ring gear 14 is placed onto the differential housing 12, the appendage 60 of the second half 44 is engaged with the aperture 62 of the first half 42. The clamp 38 is then placed to the differential housing 12 with the first and second flanges 32, 36 positioned within the pocket 40. A bolt 52 is then placed through the smooth hole 50 and engages the threaded hole 48 to secure the first and second halves 42, 44 to one another. Alternatively, hole 48 may be smooth and the bolt 52 engaged and retained by a nut. Once the two halves 42, 44 of the clamp 38 are secured to one another, the flanges 32, 36 are trapped within the pocket 40, thereby securing the ring gear 14 to the differential housing 12.

In a third preferred embodiment, the clamp 38 can comprise a single piece of formed sheet metal. A single piece clamp 54 would comprise a substantially circular ring with a break formed therein defining opposing first and second ends 56, 58 thereof. The sheet metal is ductile such that the first and second ends 56, 58 can be pulled apart to open up the single piece clamp 54 and allow the single piece clamp 54 to be placed over the flanges 32, 36 of the ring gear 14 and the differential housing 12.

Figure 6:
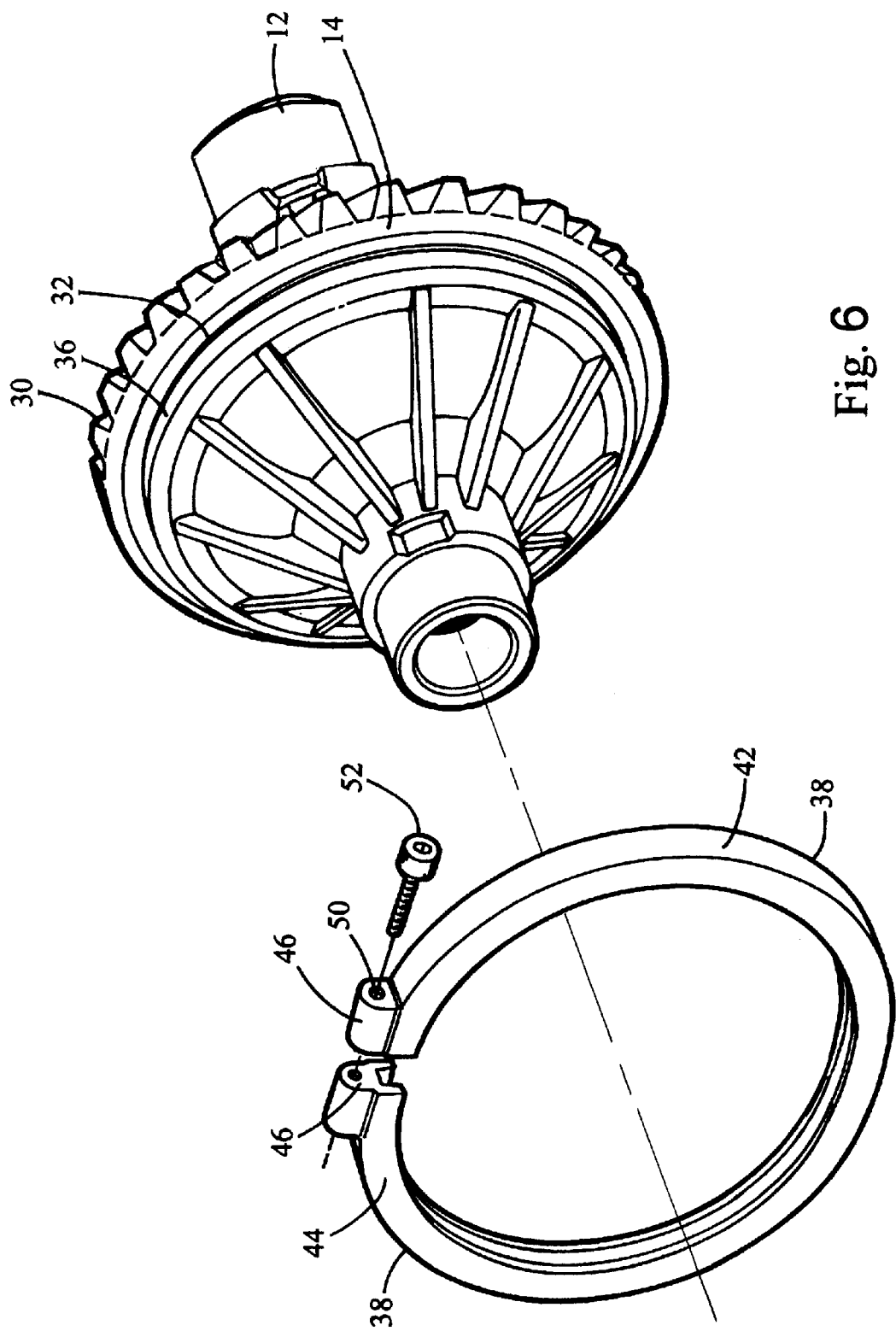
FIG. 6 is a partial exploded perspective view of a third preferred embodiment of the present invention.

Each of the ends 56, 58 include features to allow the ends to be connected. As shown in FIG. 6, each of the ends 56, 58 of the single piece clamp 54 includes a tab 60, 62 extending radially outward therefrom. The tab 60 of the first end 56 includes a threaded hole 64, and the tab 62 of the second end 58 includes a smooth hole 66. A bolt 68, extends through the smooth hole 66, and threads into the threaded hole 64 to secure the first and second ends 56, 58 together.

It can be appreciated that the tabs 46 of the two halves 42, 44 of the first and second preferred embodiments, and the ends 56, 58 of the third preferred embodiment can be attached by other known methods such as riveting, welding, swaging a pin head, upsetting of a bolt head, or any other suitable method.

The foregoing discussion discloses and describes two preferred embodiments of the invention. One skilled in the art will readily recognize from such discussion, and from the accompanying drawings and claims, that changes and modifications can be made to the invention without departing from the true spirit and fair scope of the invention as defined in the following claims. The invention has been described in an illustrative manner, and it is to be understood that the terminology which has been used is intended to be in the nature of words of description rather than of limitation.

What is claimed is:

1. A differential gear assembly comprising:
   a differential housing;
   a gear set supported within said differential housing;
   a ring gear mounted externally to said differential housing; and
   a clamp extending annularly around said differential housing and engaging external surfaces of said ring gear and said differential housing, said clamp being a single piece, arcuate shaped member having first and second ends adapted to be fastened to one another, thereby securing said ring gear to said differential housing.

2. The differential gear assembly of claim 1 wherein said gear set includes a pinion pin secured to and extending diametrically across said ring gear.

3. The differential gear assembly of claim 1 wherein said differential housing and said ring gear each include an annular flange extending therefrom.

4. The differential gear assembly of claim 3 wherein said clamp engages said flanges of said differential housing and said ring gear.

5. The differential gear assembly of claim 4 wherein said clamp includes portions defining a pocket, said pocket receiving said annular flange of said differential housing and said annular flange of said ring gear therein.

6. A differential gear assembly comprising:
   a differential housing;
   a gear set supported within said differential housing;
   a ring gear mounted externally to said differential housing; and
   a clamp extending annularly around said differential housing and engaging external surfaces of said ring gear and said differential housing, thereby securing said ring gear to said differential housing;
   said clamp including a pair of matched halves, said halves adapted to be fastened to one another.

7. The differential gear assembly of claim 6 wherein said pair of matched halves of said clamp are fastened to each other with at least one bolt.

8. The differential gear assembly of claim 7 wherein said pair of matched halves are fastened to each other at a first end by a bolt and at a second end by an appendage extending from one of said halves and being in interlocking engagement with the other of said halves.

9. The differential gear assembly of claim 6 wherein said differential housing and said ring gear each include an annular flange extending therefrom.

10. The differential gear assembly of claim 9 wherein said clamp engages said flanges of said differential housing and said ring gear.

11. The differential gear assembly of claim 10 wherein said clamp includes portions defining a pocket, said pocket receiving said annular flange of said differential housing and said annular flange of said ring gear therein.

12. The differential gear assembly of claim 6 wherein said gear set includes a pinion pin secured to and extending diametrically across said ring gear.

13. A differential gear assembly comprising:
   a differential housing having an annular flange extending therefrom;
   a gear set supported within said differential housing;
   a ring gear having an annular flange extending therefrom and being mounted externally to said differential housing; and
   a clamp engaging said flanges of said differential housing and said ring gear, said clamp including portions defining a pocket, said pocket receiving said annular flange of said differential housing and said annular flange of said ring gear therein, thereby securing said ring gear to said differential housing;
   said flange of said differential housing including an angled surface, and said flange of said ring gear including an angled surface opposite said angled surface of said differential housing.

14. The differential gear assembly of claim 13 wherein said pocket has opposing angled sides, whereby when said clamp engages said flanges, said angled surfaces of said flanges engage said angled sides of said clamp such that said clamp provides an axial clamping force to said flanges.

15. The differential gear assembly of claim 13 wherein said clamp extends annularly around said differential housing.

16. The differential gear assembly of claim 15 wherein said clamp is a single piece, arcuate shaped member having first and second ends adapted to be fastened to one another.

17. The differential gear assembly of claim 15 wherein said clamp comprises a pair of matched halves, said halves adapted to be fasted to one another.

18. The differential gear assembly of claim 17 wherein said pair of matched halves of said clamp are fastened to each other with at least one bolt.

19. The differential gear assembly of claim 18 wherein said pair of matched halves are fastened to each other at a first end by a bolt and at a second end by an appendage extending from one of said halves and being in interlocking engagement with the other of said halves.

20. The differential gear assembly of claim 13 wherein said gear set includes a pinion pin secured to and extending diametrically across said ring gear.

* * * * *